United States Patent [19]

Gomi et al.

[11] Patent Number: 4,540,153

[45] Date of Patent: Sep. 10, 1985

[54] TEMPERATURE SENSITIVE NEGATIVE-PRESSURE CONTROL VALVE

[75] Inventors: Koichi Gomi, Toyota; Shigeru Nishio, Kariya, both of Japan

[73] Assignees: Toyota Jidosha Kogyo Kabushiki Kaisha; Aisin Seiki Kabushiki Kaisha, both of Japan

[21] Appl. No.: 344,724

[22] Filed: Feb. 1, 1982

[30] Foreign Application Priority Data

Feb. 6, 1981 [JP] Japan ................................ 56-17271

[51] Int. Cl.³ .............................................. F16K 31/12
[52] U.S. Cl. ................................ 251/11; 137/DIG. 8; 236/101 C; 123/568
[58] Field of Search ........................... 236/86, 101 C; 137/627.5, 468, 596.18, 595, 505, 505.14, DIG. 8; 123/407, 421, 568; 251/11

[56] References Cited

U.S. PATENT DOCUMENTS

| | | | |
|---|---|---|---|
| 3,987,770 | 10/1976 | Nomura | 123/407 |
| 4,024,845 | 5/1977 | Nomura | 123/407 |
| 4,030,460 | 6/1977 | Tanaka et al. | 123/407 |
| 4,166,476 | 9/1979 | Yamanaka et al. | 137/DIG. 8 |
| 4,181,106 | 1/1980 | Brakebill | 123/407 |
| 4,254,938 | 3/1981 | Inada et al. | 137/DIG. 8 |
| 4,428,353 | 1/1984 | Stahly et al. | 123/407 |

Primary Examiner—Parshotam S. Lall
Assistant Examiner—W. R. Wolfe
Attorney, Agent, or Firm—Parkhurst & Oliff

[57] ABSTRACT

A temperature sensitive negative-pressure control valve is provided with a pressure adjusting means functioning to output a constant negative-pressure which is determined by the biasing force of an adjusting spring, and a temperature sensitive device for varying the biasing force of the adjusting spring, whereby variation of the biasing force of the adjusting spring imparted to the pressure adjusting device according to the temperature detected by the temperature sensitive device warrants outputting of continuously varying negative-pressure in response to the variation of the detected temperature.

4 Claims, 9 Drawing Figures

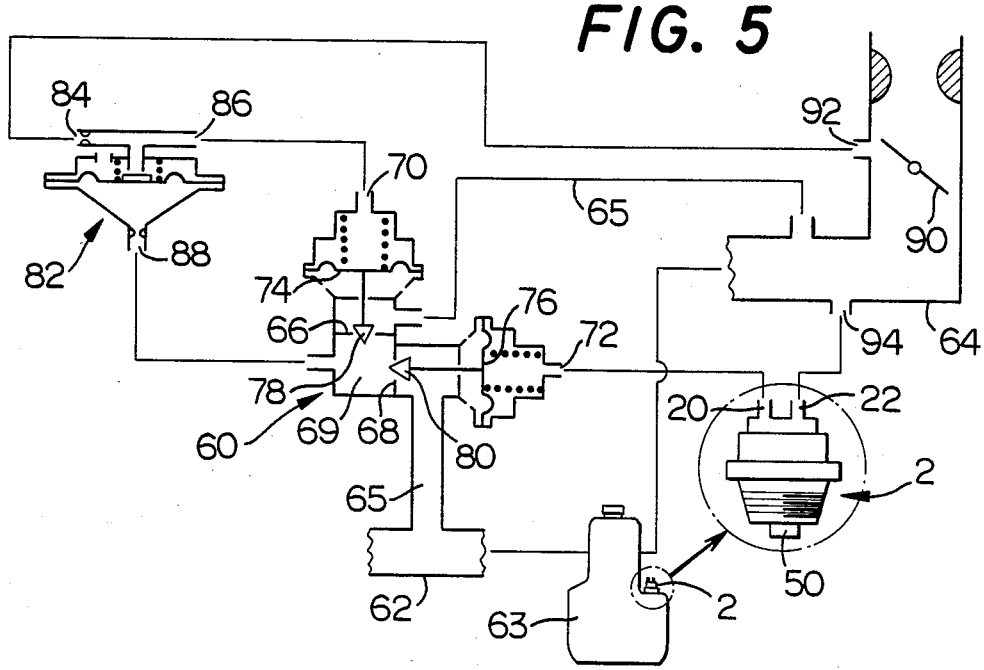
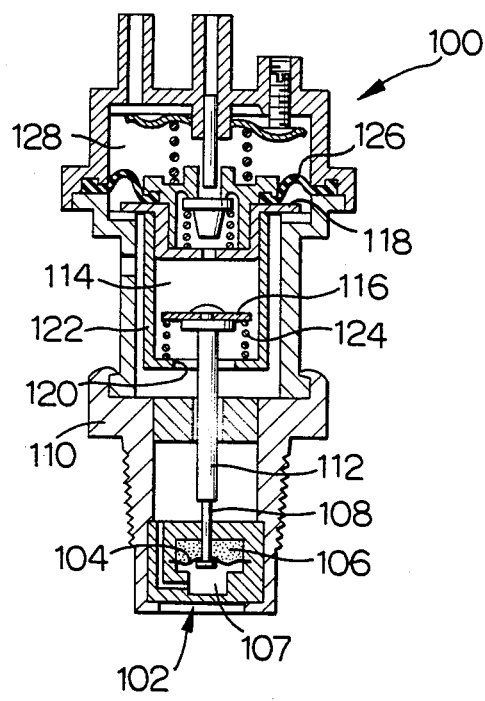
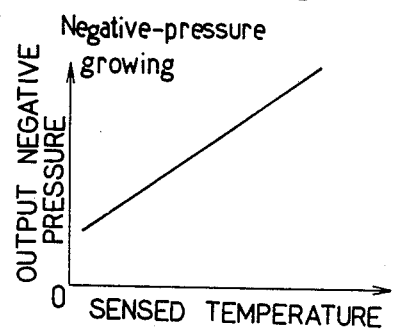
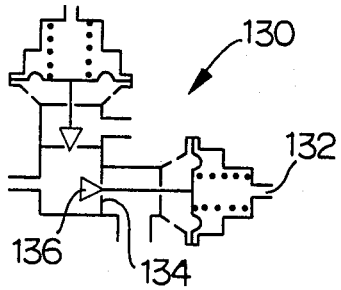

TEMPERATURE SENSITIVE NEGATIVE-PRESSURE CONTROL VALVE

BACKGROUND OF THE INVENTION

This invention relates to a vacuum or negative-pressure control valve, and more particularly to a negative-pressure control valve capable of outputting negative-pressure which is variable in response to variation of sensed or detected temperature.

As a negative-pressure controlling valve for vehicles depending on sensing or detecting of the temperature, a sucked-air temperature sensitive valve, a water temperature sensitive valve, an electromagnetic negative-pressure switching valve actuated by a temperature switch, etc., are provided in general. All of those valves are however operated only in two ways, that is to say ON or OFF. In various apparatuses incorporating this type of negative-pressure valve, such as an EXHAUST GAS RECIRCULATION controlling apparatus or system, a choke degree controlling apparatus, an ignition timing controlling apparatus, etc., a common disadvantageous weak point is difficulty of getting a steplessly continuous and smooth controlling feature sensitively variable in response to a timewise varied temperature which is detected by such a negative-pressure controlling valve. For example, the EGR controlling apparatus is required on one hand to raise EGR ratio, until the catalysis becomes active by the temperature rising after starting of the engine, for the purpose of restraining creation of nitrogen oxide ($NO_x$). However, the EGR ratio must be on the other hand restricted not to go up, i.e., it must be held down to the necessary minimum in response to heating condition of the engine, because the rising of the EGR ratio is closely related to deterioration of the vehicle driving efficiency. Conventional way of EGR ratio controlling based on the actuation from a traditional negative-pressure controlling valve, which controls the negative-pressure only in two ways of ON or OFF by the temperature detection, is liable to give rise to a sharp or abrupt change of the EGR ratio either upwards or downwards according to whether the set temperature for the valve has been reached or not. It means that at least either one of the exhaust gas condition or the driving efficiency of the vehicle is obliged to be sacrificed in the vicinity of the border line of this set temperature.

SUMMARY OF THE PRESENT INVENTION

The primary object of this invention, is to provide a temperature sensitive negative-pressure control valve capable of outputting continuously varying negative-pressure in response to sensed of detected temperature.

Another object of this invention is to provide an EGR controlling apparatus wherein recirculated amount of the exhaust gas can be continuously or steplessly reduced in response to temperature rising of the engine.

According to this invention there is provided a temperature sensitive negative-pressure control valve which comprises (a) a valve chamber communicated to an input port, an output port, and an atmosphere port, (b) a pressure adjusting means disposed in the valve chamber for adjusting negative-pressure supplied to the input port before it is output from the output port, (c) an adjusting spring for imparting a predetermined biasing force to the pressure adjusting means so that the pressure adjusting means enables outputting of negative-pressure of a constant value corresponding to the biasing force from the output port, regardless of variation of the negative-pressure supplied to the input port, and (d) a temperature sensitive means detecting temperature for thereby varying the biasing force of the spring given to the pressure adjusting means corresponding to variation of the temperature, whereby negative-pressure of continuously varied value, corresponding to variation of the detected temperature detected by the temperature sensitive means, can be output.

According to this invention, there is also provided an exhaust gas recirculation controlling system, provided with an exhaust gas recirculation circuit for connecting an air sucking pipe and an exhaust gas pipe for an engine, for recycling exhaust gas into the air sucking pipe, which comprises (a) a temperature sensitive negative-pressure control valve detecting the engine temperature for outputting negative-pressure which is continuously varied according to the temperature, (b) exhaust gas recirculation valve for adjusting amount of the exhaust gas recirculation according to the magnitude of the negative-pressure output from said temperature sensitive negative pressure control valve, whereby the amount of the exhuast gas recirculation can be continuously diminished according to the rising of the temperature of the engine.

Controlling systems utilizing negative-pressure can favorably enjoy, by adopting a temperature sensitive negative-pressure control valve of this invention, the negative pressure having good controllability, that is continuously and smoothly variable according to a timewise variable temperature. For example, an EGR apparatus incorporating this type of the valve is capable of producing a continuously variable EGR ratio according to the heating condition of the engine and effectively obtaining the best desirable exhaust gas condition and drivabilty even in the course of engine heating process.

BRIEF DESCRIPTION OF THE DRAWING

FIG. 5 is a structural view of an EGR control system including the embodiment in FIG. 1;

FIG. 7 is a view corresponding to FIG. 1 of another embodiment according to this invention;

FIG. 8 is a view corresponding to FIG. 4 of the embodiment in FIG. 7; and

FIG. 9 is a structural view of an EGR valve in an EGR controlling system in which the embodiment in FIG. 7 is employed.

DETAILED DESCRIPTION OF THE PREFERRED EMBODIMENTS

Figure 1:
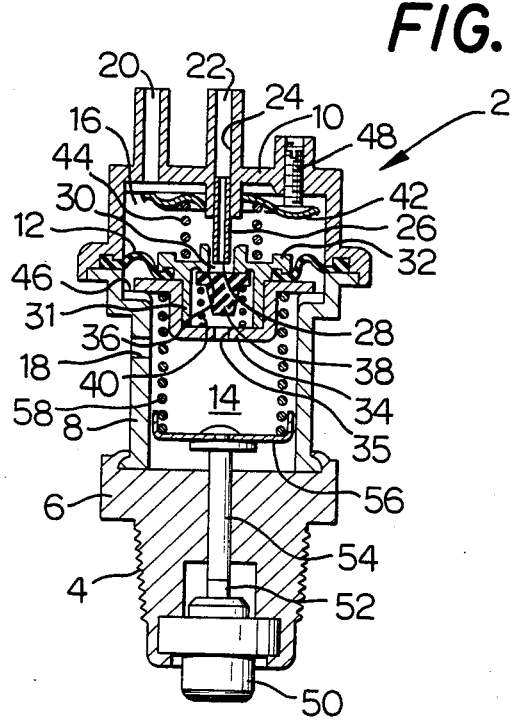
FIG. 1 is a longitudinal sectional view of an embodiment of a temperature sensitive negative-pressure control valve according to this invention.

A temperature sensitive negative-pressure control valve 2, which is generally shown in FIG. 1 as a longitudinal section thereof, is constructed of a base portion 6, on the external peripheral surface of which an attaching screw portion 4 is formed, a valve housing 8 of cylindrical form which is secured at one end thereof to the base portion 6, and a cap shaped valve cover portion 10 secured to the other end of the valve housing 8. A valve chamber confined by the base portion 6, the valve housing 8, and the valve cover portion 10 is divided into two chambers, i.e. an atmosphere chamber 14 and an output chamber 16, by a disc like diaphragm 12 of rubber which is securely pinched at the circumferential skirt portion thereof between the valve body 8 and the valve cover portion 10. The atmosphere chamber 14 is communicated through an atmosphere port 18 formed in the valve housing 8 with the ambient atmosphere, and the output chamber 16 is communicated with an output port 20 formed in the valve cover portion 10. The diaphragm 12 which is sandwiched tightly at the peripheral skirt portion thereof between the fixing position of the valve housing 8 and the valve cover portion 10 functions to gas-tightly seal the output chamber 16.

In the central part of the valve cover portion 10 an input port 22 is axially formed. Inside the input port 22 a passage 24 is formed as a continuation of the former, and a pipe 26 is inserted into an open end portion of the passage 24 on the side of the valve chamber. The pipe 26 which is secured to the valve cover portion 10 is protruded into the output chamber 16, so that an end surface thereof on the side of the atmosphere chamber 14 is formed into a stationary valve seat 28. In a central opening of the diaphragm 12 a pressure plate 32 with a communication hole 30 formed for communicating the atmosphere chamber 14 and the output chamber 16 in the central portion thereof is firmly inserted such that an annular protrusion 31 formed on the pressure plate 32 facing the atmosphere chamber 14 is inserted into a bottomed opening formed in a disc shape spring retainer 34. The inner edge of the central opening of the diaphragm 12 is so to speak pressed or pinched between the pressure plate 32 and the spring retainer 34. Numeral 35 designates an airing hole bored through the bottom of the spring retainer 34. A surrounding area of the opening of the communication hole 30 faced the atmosphere chamber 14 constitutes a movable valve seat 36. A valve member 38 is accommodated in a space confined by the annular protrusion 31 and the bottom of the spring retainer and a compression coil spring 40 as a valve spring is interposed between the valve member 38 and the spring retainer 34 so as to make the valve 38 to be seated on the movable valve seat 36. The pressure plate 32 is biased by a compression coil spring 44 as a first spring, which is interposed between the pressure plate 32 and spring receiver 42 disposed in close contact with the valve cover portion 10, toward the atmosphere chamber 14. The brim portion of the spring retainer 34 is abutted on a stepped stopper 46 formed on the upper portion of the valve housing 8 to block the movement thereof. In the valve cover portion 10 an adjusting screw 48 is threaded into a tapped hole communicated to the valve chamber for changing the position of the spring receiver 42, with a result of setting the biasing force of the compression coil spring 44 at a predetermined valve.

On the lower end of the base portion 6 an ordinary thermowax device 50 is attached as a temperature sensitive element. The thermowax device 50 is provided with an output piece 52 which is capable of moving in the axial direction in response to the variation of the detected temperature through volume varying by heat condition of wax contained in the device. A shaft 54 which keeps contact with the output piece 52 at one end thereof is axially slidably disposed in the base portion 6, being extended as long as to peep into the atmosphere chamber 14. A spring receiver 56 is attached on the other end of the shaft 54 retains a compression coil spring 58 as an adjusting spring with the aid of the lower side in FIG. 1 of the spring retainer 34 between the two. An assembly of the thermowax device 50, the shaft 54, the spring receiver 56, and the compression coil spring 58 constitute an adjusting mechanism, which is to adjust the biasing force, constantly given by the compression coil spring 44 to the pressure plate 32 in the direction of the atmosphere chamber 14, according to the detected temperature variation.

Operation of this embodiment of the negative-pressure control valve will be described hereunder.

When no negative-pressure is supplied to the input port 22 there can be no pressure difference on opposite sides of the diaphragm 12. The pressure plate 32 is therefore moved toward the atmosphere chamber 14 under the influence of the biasing force of the compression coil springs 44 and 58 so as to let the spring retainer 34 abut onto the stopper 46, because the spring 44 is designed to be greater in the spring force that the spring 58. This status is illustrated in FIG. 1.

Figure 2:
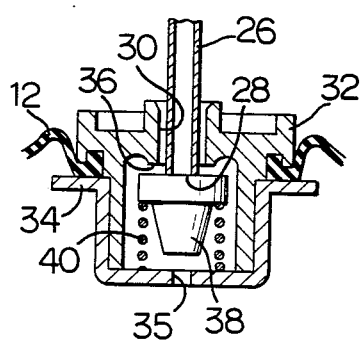
FIG. 2 and 3 are respectively an explanatory view showing operation of the embodiment in FIG. 1.
Figure 3:
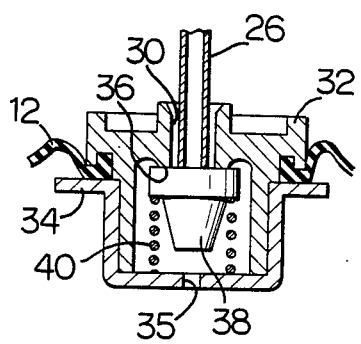

When a certain negative-pressure is supplied to the input port 22, the output chamber 16 which receives the load of the negative-pressure becomes low in the inside pressure than the atmosphere chamber 14. Deformation of the diaphragm 12 caused by the pressure difference on the opposite sides thereof forces the pressure plate 32 to be moved toward the output chamber 16. The valve member 38 is seated on the stationary valve seat 28, as shown in FIG. 2, and separated from the movable valve seat 36 due to blocking of further movement thereof by the stationary valve seat 28. The valve 38 consequently closes the passage 24 (pipe 26) communicated to the negative-pressure source and opens instead the communication hole 30. The ambient atmosphere is therefore allowed to flow into the output chamber 16, through the atmosphere port 18, the airing hole 35, and the communication hole 30, so that the pressure difference on the opposite side of the diaphragm 12 is diminished. The pressure plate 32 begins to move toward the atmospere chamber 14, finally producing an equilibrium status illustrated in FIG. 3, in which the valve member 38 is seated on the movable and stationary valve seats 36, 28. This equilibrium status is produced by a balance of the two forces opposite to each other, that is to say, a force urging the pressure plate 32 toward the atmosphere chamber 14 due to the difference of the spring force between the spring 44 and the spring 58 and another force urging the pressure plate 32 toward the output chamber 16 due to the difference of the inside pressure on the opposite side of the diaphragm 12. The value of the negative-pressure in the output chamber 16 can be therefore so regulated as to be constant corresponding to the force urging the pressure plate 32 toward the atmosphere chamber 14, irrespective or the variation of the negative-pressure supplied to the input port 22. In other words, the diaphragm 12, the stationary valve seat 28, the pressure plate 32, the valve member 38, the compression coil springs 40, 44, etc., constitute a pressure adjusting means for adjusting the negative-pressure supplied to the input port 22 to a constant level before being output from the output port 20.

Figure 4:
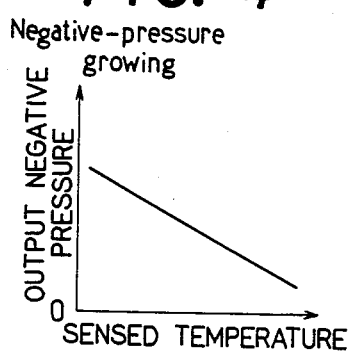
FIG. 4 is a graph showing the characteristics of the embodiment in FIG. 1.

On the other hand, rising of a detected temperature at the thermowax device 50 causes the output piece 52 to be elongated, which will in turn pushes the spring receiver 56 retaining the spring 58 upwards by way of the upward moving of the shaft 54. It consequently reduces the urging force applied to the pressure plate 32 toward the atmosphere chamber 14, which is produced by the difference of the spring force between spring 44 and the spring 58. Corresponding to the reducing of the urging force the negative-pressure value in the output chamber 16, at the equilibrium status of the temperature sensitive negative-pressure control valve 2, is also reduced. When the temperature detected by the thermowax device 50 becomes lower the above-mentioned negative-pressure value is made higher through a just reverse operation of the shaft 54 with the spring retainer 56. The above described operation makes obtaining of a desired output characteristic shown in FIG. 4 possible wherein the output negative-pressure from the output port 20 is continuously reduced according to rising of the temperature detected by the thermowax device 50, producing gradually decreasing absolute value.

The above described temperature sensitive negative-pressure control valve 2 of this invention can be applied, for example, to a back-pressure type EGR control system shown in FIG. 5.

An Exhaust Gas Recirculation valve 60 is inserted in an exhaust gas recirculation circuit 65 connecting an exhaust gas pipe 62 and an air sucking pipe 64 of a engine 63, and provided with a first orifice 66, a second orifice 68 for regulating the EGR amount, and a pressure controlling chamber 69 located between the two orifices 66, 68. Cross sectional area of flowing in these orifices 66, 68 can be respectively varied by a valve 78 and 80 which are respectively driven by a diaphragm 74 and 76 operated respectively variably according to the magnitude of the negative-pressure supplied to a first negative-pressure port 70 and a second negative-pressure port 72. A negative-pressure control valve 82 is of known structure (BPT type), being provided with an input port 84, an output port 86, and a pressure detecting port 88, for supplying a larger negative-pressure from the output port 86 thereof to the first negative-pressure port 70 of the EGR valve 60 in response to the rising of the pressure in the pressure control chamber 69 which is supplied to the pressure detecting port 88.

An EGR port 92 disposed in the air sucking pipe 64 upstream a throttle valve 90 is connected to the input port 84 of the negative-pressure control valve 82 for supplying a negative-pressure depending upon degree of open angle of the throttle valve 90. In the air sucking pipe 64 is also disposed a negative-pressure port 94 downstream the throttle valve 90 so as to supply the negative-pressure in the air sucking pipe 64 from a negative-pressure port 94 to the input port 22 of the temperature sensitive negative-pressure control valve 2. For conveniently detecting the heating condition of the engine, the negative-pressure control valve 2 is secured at a predetermined position to the engine 63 or the like. And the output pressure from the output port 20 is supplied to the second negative-pressure port 72 of the EGR valve 60.

Figure 6:
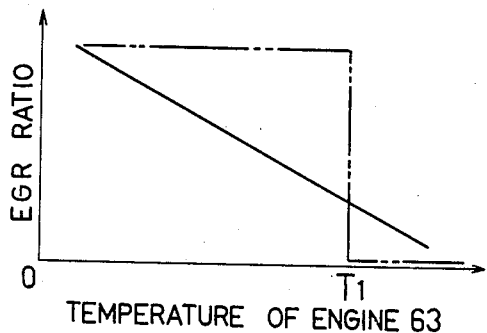
FIG. 6 is a graph showing the characteristics of the system in FIG. 5.

Pressure in the pressure control chamber 69 is therefore regulated so as to be constant in the vicinity of the ambient atmospheric pressure due to operation of the valve 78 driven by the diaphragm 74 and a known EGR control device in a negative-pressure control valve 82, so that the EGR ratio can be controlled at a constant level irrespective of the amount of the sucked air into the air sucking pipe 64. Besides, gradually decreasing negative-pressure in response to the rising temperature of the heating of the engine is supplied to the second negative-pressure port 72 so as to make the cross sectional area of flowing in the second orifice 68 to be gradually throttled. It naturally cause the EGR ratio to be continuously or steplessly lowered as shown in FIG. 6. Incidentally the two-dot-chain line in FIG. 6 indicates the EGR ratio characteristic when a traditional temperature sensitive control valve is used in an EGR control device wherein the valve is operated to ON or OFF taking a temperature $T_1$ as the border line for working to either the ON or OFF side.

As mentioned in detail above the EGR ratio can be continuously varied, and a desirable EGR ratio corresponding to the heating condition of the engine is assured all the time, which warrants the best condition for the then desirable exhaust gas condition and driving efficiency.

Another embodiment of this invention will be described next. This embodiment is different from the previous one only in the adjusting mechanism, description on the same portions and parts being therefore omitted.

In a temperature sensitive negative-pressure control valve 100 illustrated in FIG. 7, a thermowax device 102 as a temperature sensitive device which inversely works to the earlier mentioned thermowax device 50 is firmly disposed in a base portions 110. An inner chamber of the thermowax device 102 is divided into two chambers by a diaphragm 104, i.e., a wax chamber 106 filled with wax and an air chamber 107 communicated with the ambient atmosphere. An output piece 108 which is connected at one end thereof to the central portion of the diaphragm 104 is extended through the wax chamber 106 as far as outside the thermowax device 102. The output piece 108 is connected at the other end thereof to a shaft 112 axially slidably retained in the base portion 110. On the other end of the shaft 112 protruded into an atmosphere chamber 114 a disc shaped spring receiver 116 is secured.

A spring retainer 118 similar to that in the previous embodiment is fitted thereon by an opening portion of a bottomed cylindrical member 122 provided with a hole 120 in the central portion of a bottom thereof to extend therethrough. Between the spring receiver 116 and bottom of the bottomed cylindrical member 122 a compression coil spring 124 as an adjusting spring is interposed.

The output piece 108 is retracted, when the thermowax device 102 detects a rising temperature, so as to lower the shaft 112. The spring 124 is further compressed, which in turn increases the urging force applied on a diaphragm 126 in a direction to the atmosphere chamber 114. This function of the embodiment warrants obtaining of the characteristic line shown in the graph of FIG. 8.

The negative-pressure control valve 100 of this embodiment can be similarly employable in the EGR controlling system shown in FIG. 5 as a substitute for the control valve 2, with the EGR valve 60 being replaced by an EGR valve 130. The EGR valve 130 is different from the EGR valve 60 only in the shape of a valve 136, wherein such a valve 136 closes an orifice 134 when the negative-pressure supplied to a second negative-pressure port 132 grows larger. In other words, the EGR valve 130 is featured just opposite to the EGR valve 60 in respect of the relation between the amplitude of the negative-pressure supplied to the second negative-pressure port 72 and the degree of opening of the orifice 68. Through combination of the temperature sensitive negative-pressure control valve 100 and the EGR valve 130 the same EGR ratio control in the EGR controlling system in FIG. 5 can be therefore obtained.

Only two embodiments of the EGR control valve according to this invention have been explained, with reference to the drawing, presuming application thereof in one example. This invention can be naturally applied to other modes and systems.

The temperature sensitive negative-pressure control valve 2, 100 of this invention can be applied, not being limited to the above exemplified EGR control system, in various systems where negative-pressure continuously variable in response to the temperature variation is required, such as an ignition timing controlling system, a choke opening degree controlling system, and so on.

In the EGR controlling system in FIG. 5, disposition of a vacuum tank between the negative-pressure port 94 and the input port 22 is also allowable, supplying of negative-pressure to the input port 22 from another source of negative-pressure, for example a vacuum pump is permissible.

Furthermore, the thermowax device 50, 102 may be substituted for other temperature sensitive devices such as bimetals.

The above disclosure is concerned to only a few embodiments. This invention is by no means limited to those embodiments, but may be changed and modified in various ways for those skilled in the art without departing from the spirit and scope of this invention.

What is claimed is:

1. A temperature sensitive negative-pressure control valve comprising:

a valve chamber communicating with an input port, an output port and an atmosphere port;

pressure adjusting means disposed in said valve chamber for regulating a negative pressure which is output through said output port, said presure adjusting means including a diaphragm dividing said valve chamber into an output chamber communicating with said output port, and an atmosphere chamber communicating with said atmosphere port, said diaphragm being movable by a pressure difference between said output and atmosphere chambers, a communication passage for providing communication between said output and atmosphere chambers, a stationary valve seat defining an opening communicating with said input port, a movable valve seat defining one open end of said communication passage, a valve member movable with said diaphragm to open said one open end of the communication passage when said diaphragm is moved toward said output chamber, and to open said opening of the stationary valve seat for communicating said input port and said output chamber when said diaphragm is moved toward said atmosphere chamber, so that said valve member is placed in an equilibrium state in which the valve member is seated on both of said stationary and movable valve seats, a pipe communicating at one end thereof with said input port and protruded at the other end in said output chamber, said stationary valve seat being formed by an end surface of said pipe at said other end thereof, a pressure plate fixedly disposed in said diaphragm so as to be movable with the diaphragm relative to said stationary valve seat, said pressure plate having said communication passage and said movable valve seat, said other end of the pipe being locating in said communication passage, and a first spring biasing said pressure plate toward said atmosphere chamber, said valve member being biased toward said pressure plate so as to be normally seated on said movable valve seat, said valve being seated on said stationary valve seat when the valve is moved with the pressure plate toward said output chamber, whereby said movable valve seat is separated from said valve member when said pressure plate is further moved toward said output chamber;

an adjusting spring for imparting a biasing force to said diaphragm in one of opposite directions toward and away from said atmosphere chamber, said pressure difference between the output and atmosphere chamers in said equilibrium state being determined by said biasing force, whereby the negative pressure to be supplied from said output chamber is determined by said biasing force, regardless of a variation in the negative pressure applied to said input port; and temperature sensitive means for detecting a temperature, said temperature sensitive means having an output piece movable to vary said biasing force of the adjusting spring imparted to said diaphragm, in response to a variation in the detected temperature, whereby the negative pressure to be output from said output chamber through said output port is continuously varied according to said variation in the detected temperature.

2. A temperature sensitive negative-pressure control valve as set forth in claim 1, wherein said temperature sensitive means is a thermowax device having an output piece which is moved according to said variation in the detected temperature to change said biasing force of said adjusting spring according to a distance of movement of said output piece.

3. A temperature sensitive negative-pressure control valve as set forth in claim 2, wherein said pressure adjusting spring is a compression coil spring disposed in said atmosphere chamber to bias said pressure plate toward said output chamber, and said output piece of said thermowax device is operatively connected to one end of said coil spring, and moved toward said pressure plate to increase the biasing force of said coil spring according to a rise of the detected temperature, said negative-pressure output from said output port being continuously reduced as said biasing force of the coil spring is increased.

4. A temperature sensitive negative-pressure control valve as set forth in claim 2, wherein said pressure adjusting spring is a compression coil spring disposed in said atmosphere chamber to bias said pressure plate toward said atmosphere chamber, and said output piece of said temperature sensitive means is operatively connected to one end of said coil spring and moved away from said pressure plate to increase the biasing force of said coil spring according to a rise of the detected temperature, said negative-pressure output from said output port is continuously increased as said biasing force of the coil spring is increased.

* * * * *